United States Patent
Barkan et al.

(10) Patent No.: US 11,326,932 B2
(45) Date of Patent: May 10, 2022

(54) WEIGH PLATTER ASSEMBLY WITH OFF-PLATTER DETECTION

(71) Applicant: ZEBRA TECHNOLOGIES CORPORATION, Lincolnshire, IL (US)

(72) Inventors: Edward Barkan, Miller Place, NY (US); Darran Michael Handshaw, Sound Beach, NY (US); Mark Drzymala, Saint James, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 98 days.

(21) Appl. No.: 16/724,082

(22) Filed: Dec. 20, 2019

(65) Prior Publication Data

US 2021/0190577 A1 Jun. 24, 2021

(51) Int. Cl.

| | |
|---|---|
| *G01G 19/40* | (2006.01) |
| *G01V 8/12* | (2006.01) |
| *G06Q 20/20* | (2012.01) |
| *G06K 7/14* | (2006.01) |
| *G01G 21/22* | (2006.01) |
| *G01G 19/414* | (2006.01) |

(52) U.S. Cl.
CPC ............. *G01G 19/40* (2013.01); *G01G 21/22* (2013.01); *G01V 8/12* (2013.01); *G06K 7/1413* (2013.01); *G06Q 20/208* (2013.01)

(58) Field of Classification Search
CPC .... G01G 19/40; G01G 19/4144; G01G 21/22; G01V 8/12; G06K 7/1413; G06Q 20/208
See application file for complete search history.

(56) References Cited

U.S. PATENT DOCUMENTS

| | | | |
|---|---|---|---|
| 5,058,691 A | * | 10/1991 | Sela ....................... G01G 21/22 177/50 |
| 5,834,708 A | | 11/1998 | Svetal et al. |
| 8,118,227 B2 | | 2/2012 | Veksland et al. |
| 8,430,318 B2 | | 4/2013 | McQueen et al. |
| 8,556,175 B2 | | 10/2013 | McQueen et al. |
| 8,561,902 B2 | | 10/2013 | McQueen et al. |
| 8,822,848 B2 | | 9/2014 | Meagher |
| 8,833,659 B2 | | 9/2014 | McQueen et al. |
| 9,064,395 B2 | | 6/2015 | Shearin et al. |
| 9,347,819 B2 | * | 5/2016 | Atwater ............... G06K 9/3216 |

(Continued)

*Primary Examiner* — Randy W Gibson
(74) *Attorney, Agent, or Firm* — Yuri Astvatsaturov

(57) ABSTRACT

A weigh platter assembly includes a weigh platter having a proximal edge and a lateral edge and an off-platter detection assembly. The off-platter detection assembly has an assembly field-of-view (field-of-view) extending from the proximal edge and constrained to have an assembly central field-of-view axis substantially parallel to the lateral edge and at least one lateral boundary substantially adjacent to the lateral edge. A light emission assembly has a light source and emits a light away from the proximal edge. A light detection assembly has a light sensor and detects at least a portion of the light reflected towards the proximal edge. A controller allows the measured weight to be recorded in response to a first value from the light detection assembly and prevents the measured weight from being recorded and/or provides an alert in response to a second value from the light detection assembly.

39 Claims, 11 Drawing Sheets

(56) References Cited

U.S. PATENT DOCUMENTS

| | | |
|---|---|---|
| 10,422,689 B2 | 9/2019 | Drzymala et al. |
| 2010/0139989 A1 | 6/2010 | Atwater et al. |
| 2011/0127333 A1 | 6/2011 | Veksland et al. |
| 2011/0232972 A1 | 9/2011 | McQueen et al. |
| 2013/0075168 A1 | 5/2013 | Amundsen et al. |
| 2017/0068863 A1 | 3/2017 | Rattner et al. |
| 2019/0236531 A1 | 8/2019 | Adato et al. |

* cited by examiner

WEIGH PLATTER ASSEMBLY WITH OFF-PLATTER DETECTION

FIELD OF THE DISCLOSURE

The present patent relates generally to weigh platters assemblies and, in particular, to weigh platter assemblies having off-platter detection for use in barcode readers.

BACKGROUND

One of the main functions of a weigh platter, whether used alone or in conjunction with a barcode scanner at a point-of-sale (POS), is to weigh produce or other products that are priced by weight in order to assist in determining the price of the produce or product. However, produce and products are varied in shape and size and there can be issues where part of the produce or product sits off of the weigh platter, resulting in incorrect weight measurement and, therefore, incorrect pricing. Therefore, there is a need to be able to identify when produce or products being weighed on a weigh platter extend off of the weigh platter during the weighing process to reduce or eliminate instances of incorrect weight measurement and pricing.

SUMMARY

In an embodiment, the present invention is a weigh platter assembly for use in a barcode scanner. The weigh platter assembly comprises a weigh platter and an off-platter detection assembly. The weigh platter has a surface extending in a first transverse plane, wherein the weigh platter is configured to measure a weight of an object placed on the surface and the surface has a proximal edge and a lateral edge non-parallel relative to the proximal edge. The off-platter detection assembly comprises an assembly field-of-view extending from the proximal edge, the assembly field-of-view being constrained to have an assembly central field-of-view axis substantially parallel relative to the lateral edge and at least one lateral boundary substantially adjacent to the lateral edge. A light emission assembly having a light source is configured to emit a light away from the proximal edge. A light detection assembly has a light sensor and is configured to detect at least a portion of the light reflected towards the proximal edge. A controller is in communication with the light detection assembly and is configured to allow the measured weight to be recorded by a host system operatively coupled to the controller in response to a first value from the light detection assembly and prevent the measured weight from being recorded by the host system and/or provide an alert in response to a second value from the light detection assembly.

In another embodiment, the present invention is a weigh platter assembly for use in a barcode scanner. The weigh platter assembly comprises a weigh platter and an off-platter detection assembly. The weigh platter has a surface extending in a traverse plane, wherein the weigh platter is configured to measure a weight of an object placed on the surface and the surface has a proximal edge, a distal edge opposite the proximal edge, and a lateral edge non-parallel relative to the proximal edge and the distal edge. The off-platter detection assembly comprises a light emission assembly, a light detection assembly, and a controller. The light emission assembly is configured to emit one or more pulses of light away from the proximal edge and along the lateral edge. The light detection assembly has a field-of-view (field-of-view) extending from the proximal edge to at least the distal edge and along the lateral edge and has a light sensor configured to detect at least a portion of the one or more pulses of light reflected towards the proximal edge within the field-of-view. The field-of-view has a central field-of-view axis parallel relative to the lateral edge. The controller is configured to measure a time-of-flight (TOF) of reflected light, which comprises the time the one or more pulses of light are emitted by the light emission assembly to the time the at least a portion of the one or more pulses of light are reflected back to the light detection assembly and detected by the light sensor. The controller is further configured to allow the measured weight to be recorded by a host system operatively coupled to the controller in response to a measured TOF being equal to or greater than a predetermined TOF and prevent the measured weight from being recorded by the host system and/or provide an alert in response to a measured TOF being less than the predetermined TOF.

In yet another embodiment, the present invention is a weigh platter assembly for use in a barcode scanner. The weigh platter assembly comprises a weigh platter and an off-platter detection assembly. The weigh platter has a surface extending in a transverse plane, wherein the weigh platter is configured to measure a weight of an object placed on the surface and the surface has a proximal edge, a distal edge opposite the proximal edge, and a lateral edge non-parallel relative to the proximal edge and the distal edge. The off-platter detection assembly has a light emission assembly, a light detection assembly, and a controller. The light emission assembly is configured to emit light away from the proximal edge and along the lateral edge. The light detection assembly has a field-of-view (field-of-view) along the lateral edge and a light sensor configured to detect at least a portion of light reflected towards the proximal edge within the field-of-view. The controller is configured to measure a signal strength of the reflected light detected by the light sensor, allow the measured weight to be recorded by a host system operatively coupled to the controller in response to the strength of the reflected light detected by the light sensor being equal to or less than a predetermined strength value, and prevent the measured weight from being recorded by the host system and/or provide an alert in response to the strength of the reflected light detected by the light sensor being greater than the predetermined strength value.

In still yet another embodiment, the present invention is a weigh platter assembly for use in a barcode scanner. The weigh platter assembly comprises a weigh platter and an off-platter detection assembly. The weigh platter has a surface extending in a transverse plane, wherein the weigh platter is configured to measure a weight of an object placed on the surface and the surface has a proximal edge, a distal edge opposite the proximal edge, and a lateral edge non-parallel relative to the proximal edge and the distal edge. The off-platter detection assembly has a light emission assembly, a light detection assembly, and a controller. The light emission assembly is configured to emit light away from the proximal edge and has a field-of-view (field-of-view) extending uncollimated in a first plane and collimated in a second plane perpendicular to the first plane. The light detection assembly has a field-of-view and a light sensor configured to detect at least a portion of light reflected towards the proximal edge within the light detection assembly field-of-view. The light detection assembly field-of-view extends uncollimated in the second plane and collimated in the first plane and has a lateral boundary parallel relative to the lateral edge and substantially adjacent the lateral edge. The light emission assembly field-of-view overlaps the light detection assembly field-of-view to form an overlap region substantially adjacent and parallel to the lateral edge, the overlap region having a superior boundary parallel relative to the surface of the weigh platter substantially adjacent the surface of the weigh platter and a lateral boundary parallel relative to the lateral edge and substantially adjacent the lateral edge. The controller is configured to allow the measured weight to be recorded by the host system when the light sensor does not detect light reflected back to the light detection assembly within the overlap region and to prevent the measured weight from being recorded by the host system and/or provide an alert when the light sensor detects light reflected back to the light detection assembly within the overlap region.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed examples, and explain various principles and advantages of those embodiments.

Figure 1:
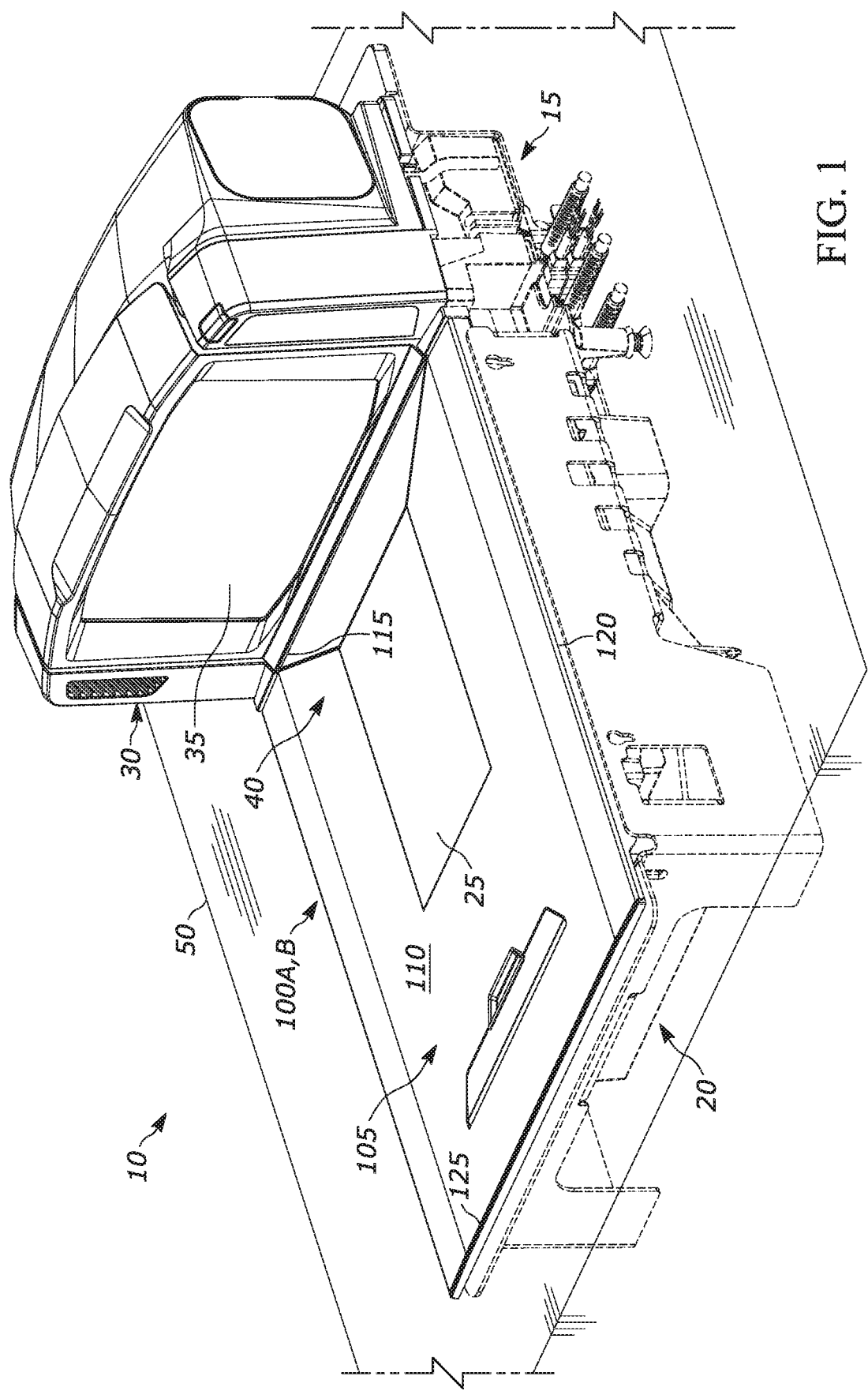
FIG. 1 illustrates a front perspective view of an example barcode scanner having a weigh platter assembly.

The apparatus and method components have been represented where appropriate by conventional symbols in the drawings, showing only those specific details that are pertinent to understanding the disclosed examples so as not to obscure the disclosure with details that will be readily apparent to those of ordinary skill in the art having the benefit of the description herein.

DETAILED DESCRIPTION

The examples disclosed herein relate to weigh platter assemblies, which could be used with barcode readers, such as bioptic barcode readers, having off-platter detection assemblies to identify when an object extends off of the weigh platter of the weigh platter assembly.

Referring to FIG. 1, an example barcode scanner 10, such as the Zebra® MP7000 bioptic barcode reader, is shown and can be configured to be supported by a workstation 50, such as a checkout counter at a POS of a retail store. Barcode scanner 10 has a housing 15 that includes a lower housing 20 that houses a weigh platter assembly 100A, 100B and an upper housing 30 that extends generally perpendicular to lower housing 20. Upper housing 30 includes a generally vertical window 35 to allow a first set of optical components positioned within upper housing 30 to direct a first field-of-view through vertical window 35. In addition, if barcode scanner 10 is a bioptic barcode scanner, lower housing 20 will include a generally horizontal window 25, which in the example shown is positioned in a weigh platter 105 of weigh platter assembly 100A, 100B to allow a second set of optical components positioned within lower housing 20 to direct a second field of view through horizontal window 25. The first and second fields of view intersect to define a product scanning region 40 of barcode scanner 10 where a product can be scanned for sale at the POS.

Although weigh platter assembly 100A, 100B is described above and shown in FIG. 1 as being used with a barcode scanner or bioptic barcode reader, weigh platter assembly 100A, 100B can be used with any type of scanner or POS device or can be used as a stand-alone scale or weighing device. Whether used as part of a barcode reader, scanner or POS device, or as a stand-alone scale or weighing device, weigh platter assembly 100A, 100B will generally include a weigh platter 105 that is configured to measure the weight of an object placed on weigh platter 105. Weigh platter 105 has surface 110 that is generally parallel to a top surface of workstation 50 and extends in a first transverse plane, a proximal edge 115, lateral edge 120, and distal edge 125. In the example shown, proximal edge 115 is adjacent upper housing 30 and would be the edge furthest from a user of weigh platter assembly 100A, 100B and/or barcode scanner 10. Lateral edge 120 extends non-parallel to proximal edge 115. Distal edge 125 is opposite proximal edge 115, would be the edge closest to the user, and extends non-parallel to lateral edge 120. In the example shown, weigh platter is generally rectangular and lateral edge 120 is perpendicular to proximal edge 115 and distal edge 125 is perpendicular to lateral edge 120 and parallel to proximal edge 115.

Figure 2:
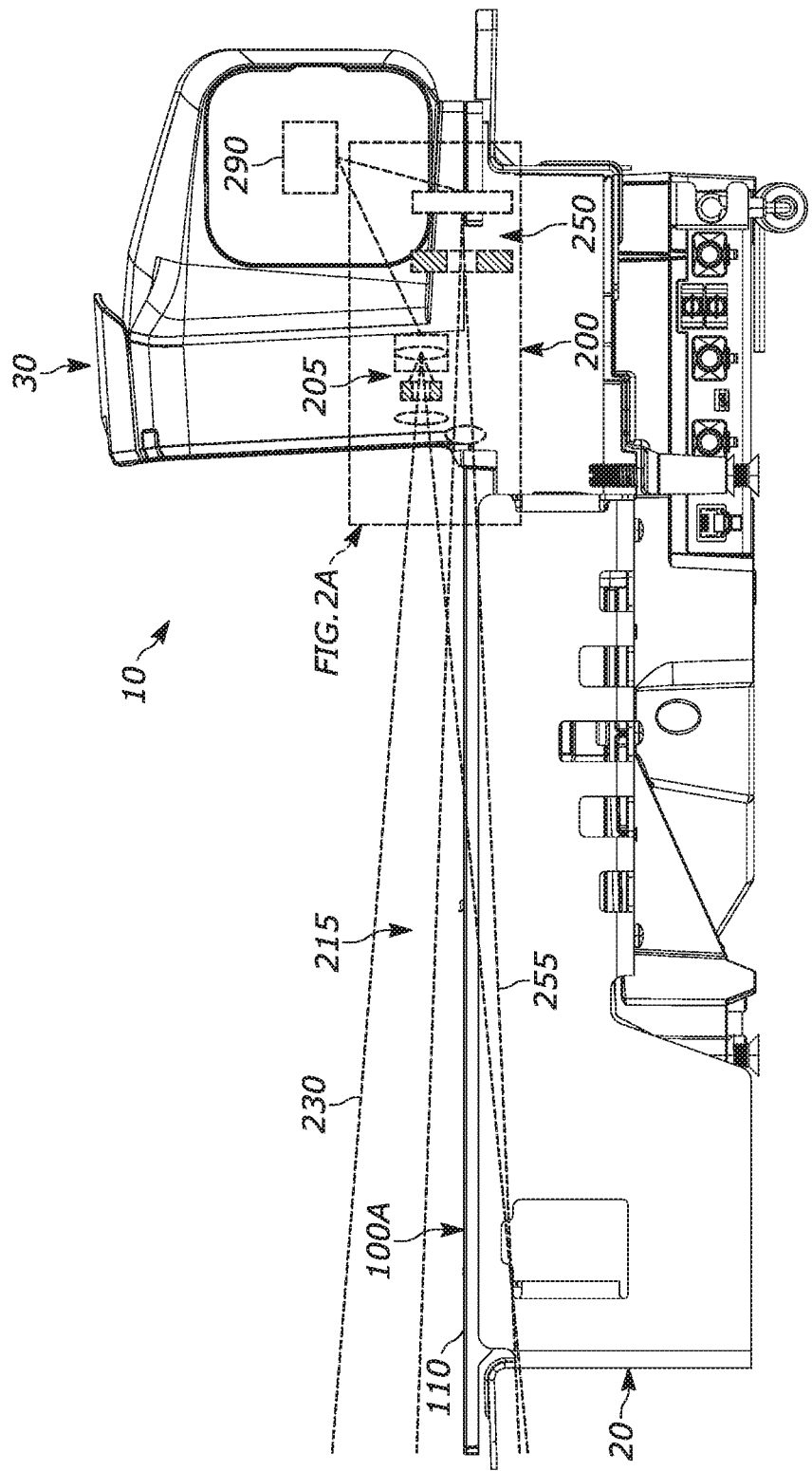
FIG. 2 illustrates a side view of the barcode scanner of FIG. 1 with the weigh platter assembly having a first example off-platter detection assembly.
Figure 2A:
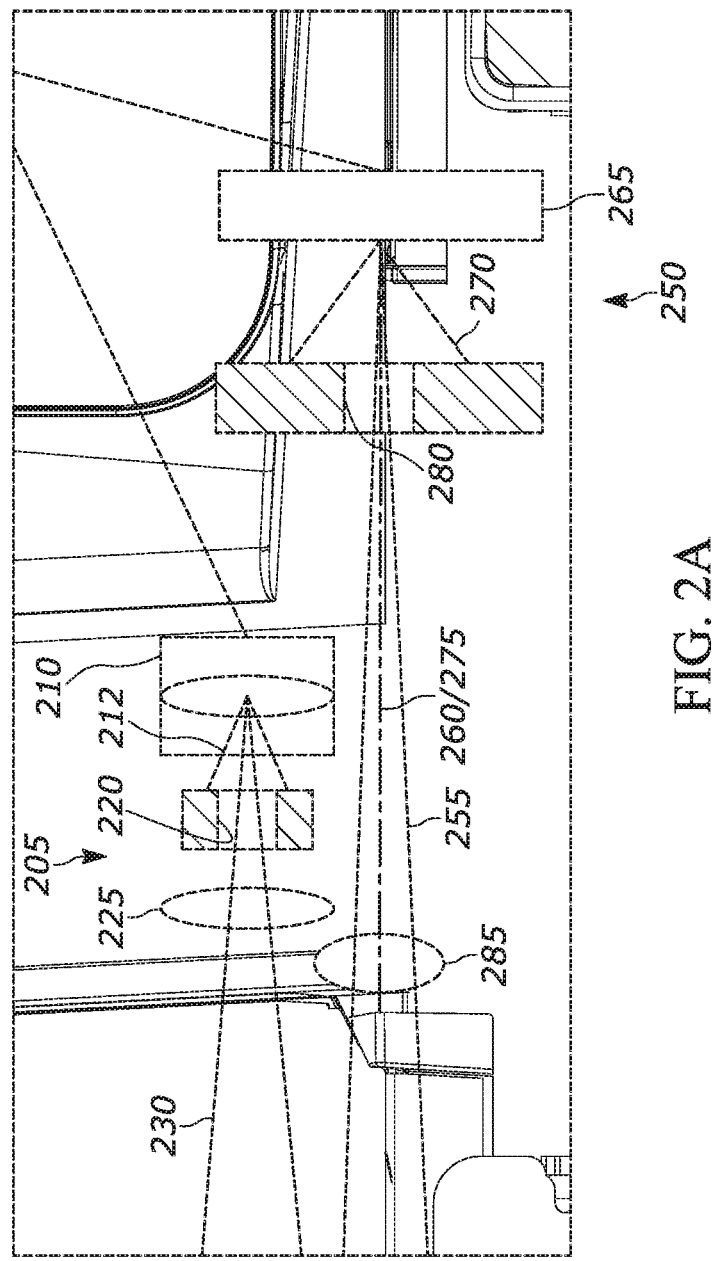
FIG. 2A is an enlarged view of a portion of the barcode scanner of FIG. 2.
Figure 3:
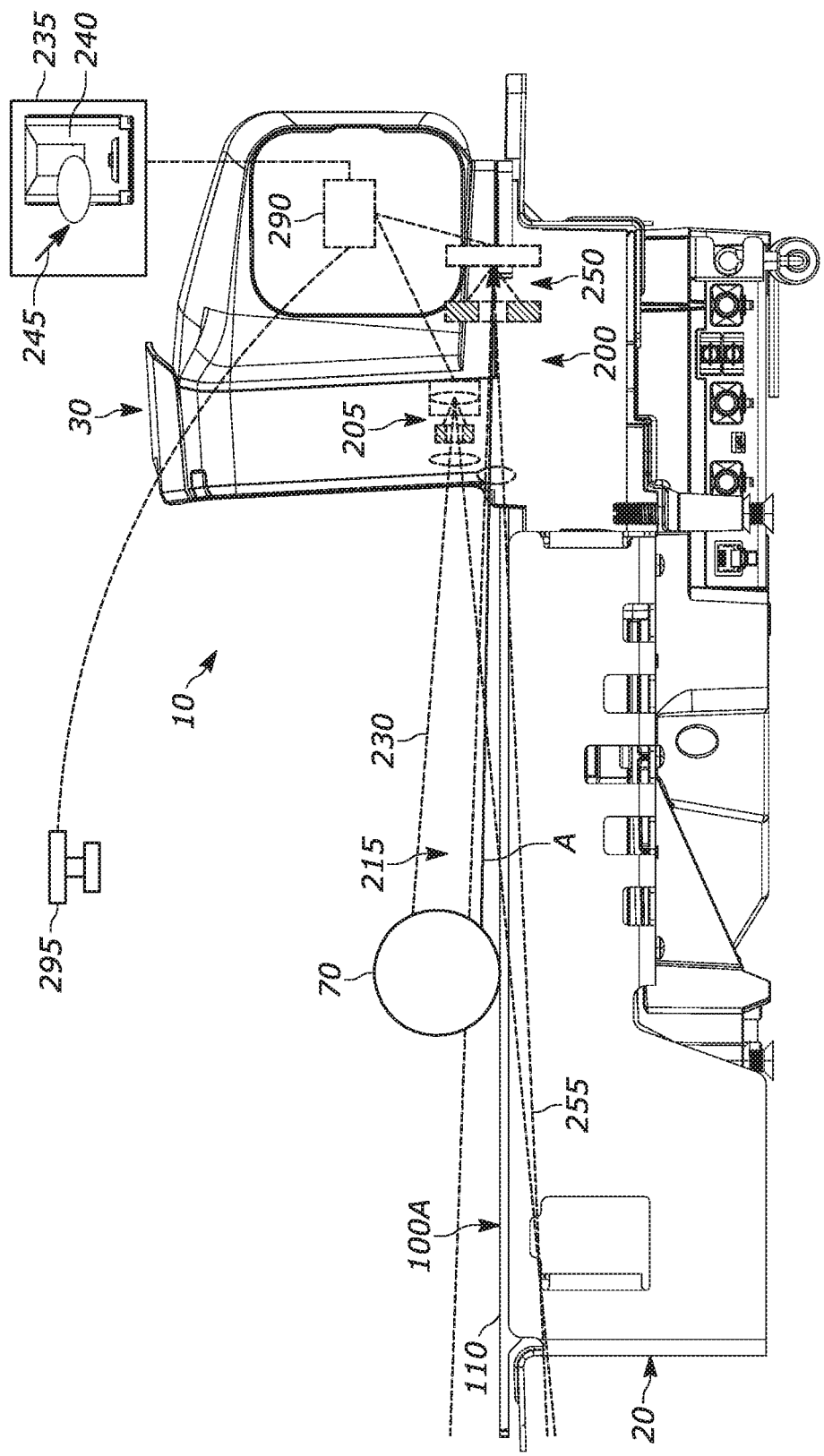
FIG. 3 illustrates the barcode scanner of FIG. 2 with an object extending across a lateral edge of the weigh platter assembly.
Figure 4:
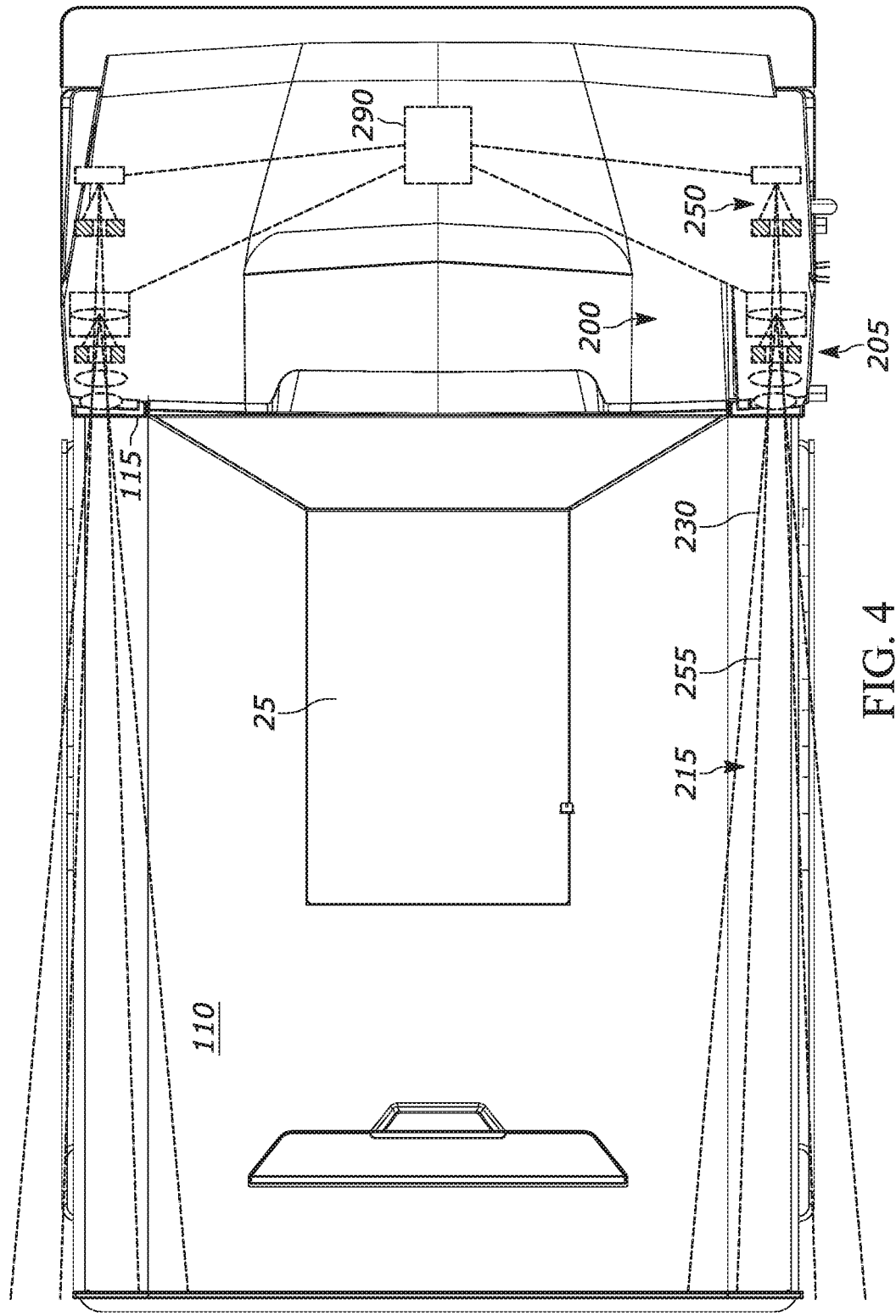
FIG. 4 illustrates a top view of the barcode scanner of FIG. 2.
Figure 5:
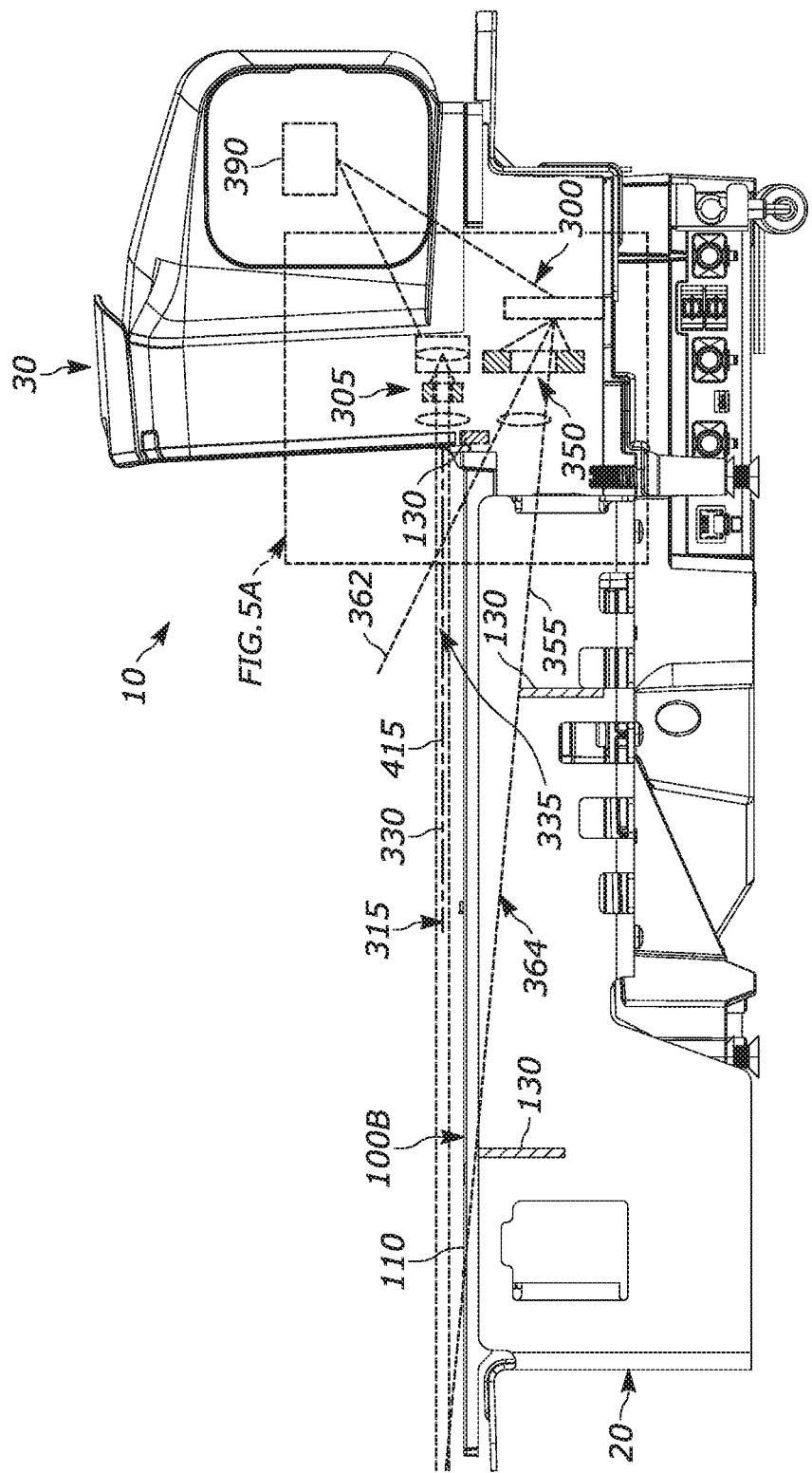
FIG. 5 illustrates a side view of the barcode scanner of FIG. 1 with the weigh platter assembly having a second example off-platter detection assembly.
Figure 5A:
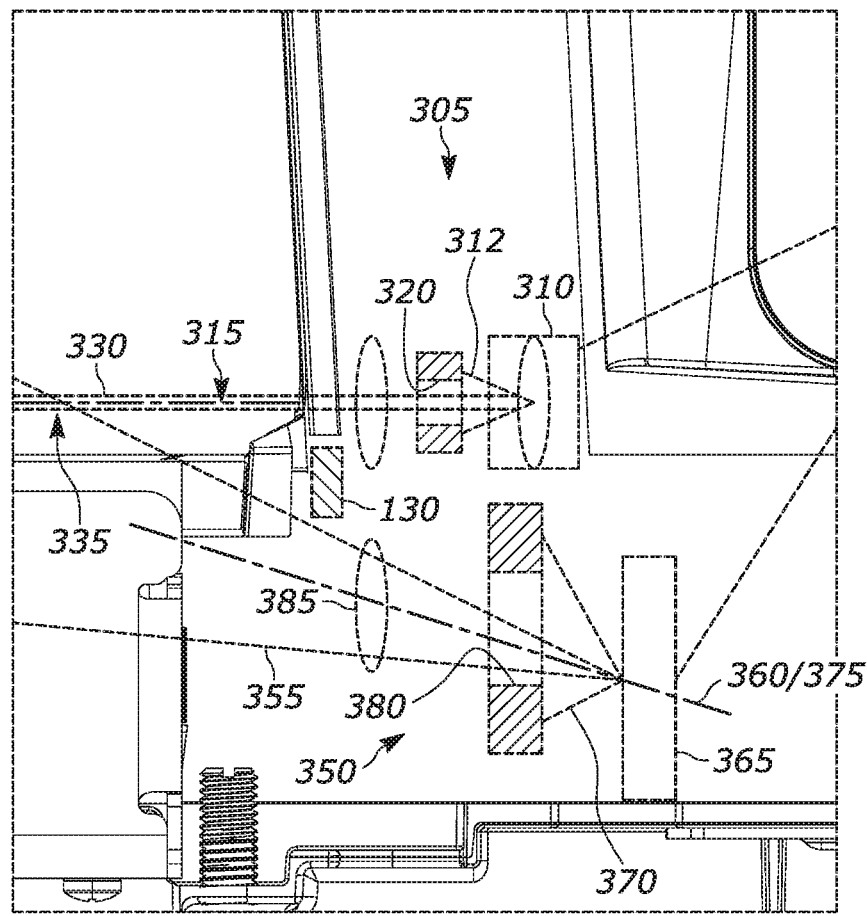
FIG. 5A is an enlarged view of a portion of the barcode scanner of FIG. 5.

Referring to FIGS. 2-4, barcode scanner 10 is illustrated with an example weigh platter assembly 100A, which includes a weigh platter 105 and a first example off-platter detection assembly 200. The example off-platter detection assembly 200 generally includes a light emission assembly 205, light detection assembly 250, and controller 290 in communication with light emission assembly 205 and light detection assembly 250. For simplicity, only a single light emission assembly 205 and light detection assembly 250 along lateral edge 120 are described herein, however, it will be understood that off-platter detection assembly 200 can also include a second light emission assembly and a second light detection assembly on an opposite side of weigh platter assembly 100A to detect objects that extend over an opposing lateral edge, opposite lateral edge 120, as shown in FIG. 4.

Figure 9:
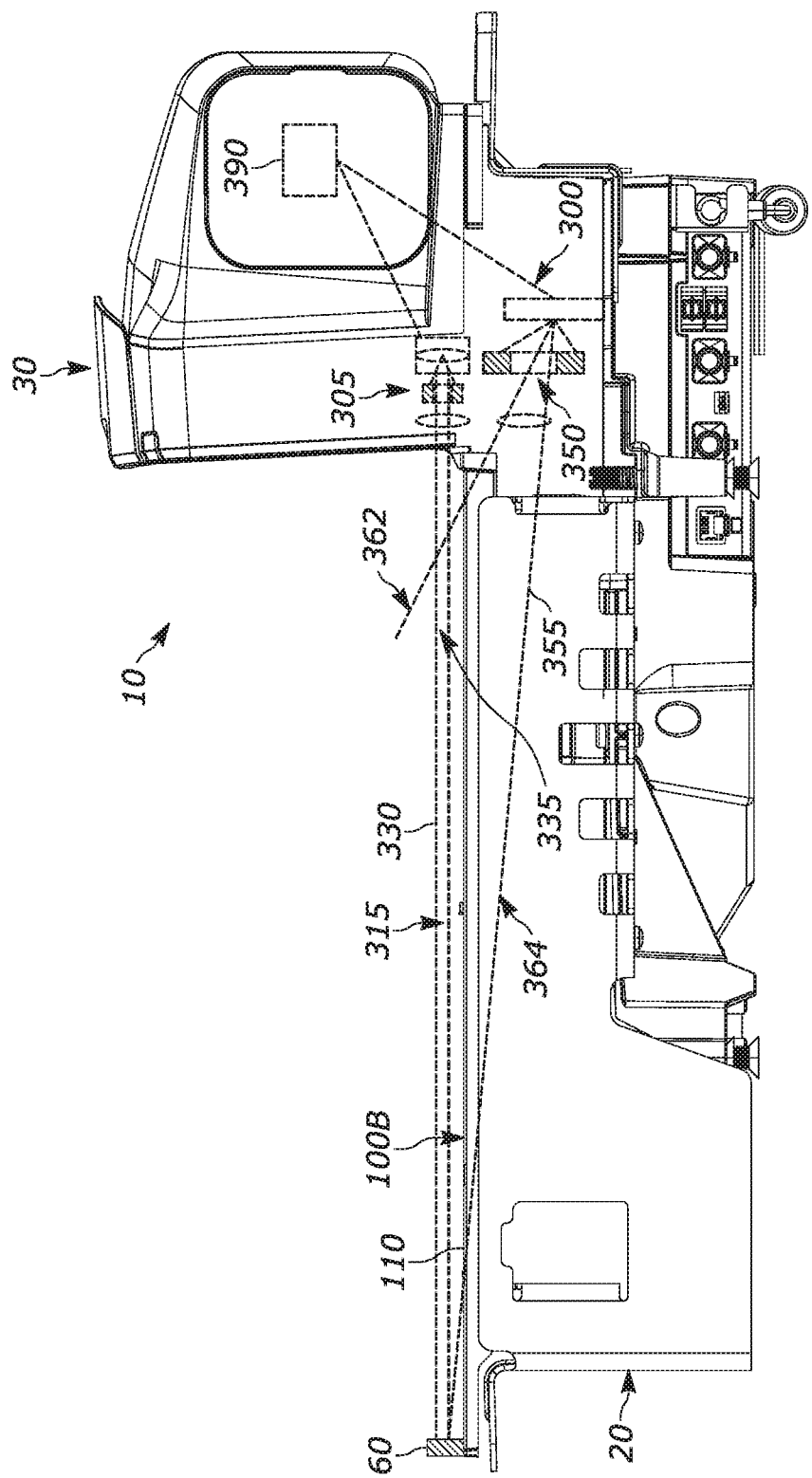
FIG. 9 illustrates a side view of the barcode scanner of FIG. 5 with an alternative baffle arrangement.

Light emission assembly 205 can be located within upper housing 30 of housing 15, has a light source 210, and is configured to emit a light 215 away from proximal edge 115, towards distal edge 125, and along lateral edge 120 of weigh platter 105. Light source 210 could be an LED that is focused into a narrow beam, similar to an aiming dot used in scanners, a focused laser beam, etc. and light 215 could be pulses of light (such as in a light imaging, detection, and ranging (LIDAR) system) or a continuous light beam and could be on the infrared wavelength, visible light wavelength, or any wavelength desired. Light source 210 can have a field-of-view 212 and light emission assembly 205 can also include an aperture 220, which could be formed in a wall or protrusion of housing 15 or could be formed through another wall or structure that is part of weigh platter assembly 100A, positioned in front of light source 210 to constrain field-of-view 212 of light source 210 into a narrow field-of-view 230 along lateral edge 120 of weigh platter 105. A lens 225 can also be positioned in front of aperture 220 and configured to focus the one or more pluses of light 215. In addition, although off-platter detection assembly 200 does not require any bumps or physical barriers at distal edge 125 of weigh platter 105, if desired, a barrier 60 (see FIG. 9) can be positioned at distal edge 125 of surface 110 of weigh platter 105, opposite light emission assembly 205, and can be made of a material and/or color that is absorptive to the wavelength of light 215 to prevent reflection of light 215 from objects or users that are beyond distal edge 125.

Light detection assembly 250 can also be located within housing 15 and has a field-of-view 255, with a central field-of-view axis 260 that is substantially adjacent to and parallel relative to lateral edge 120, that extends from proximal edge 115 to at least distal edge 125 and along lateral edge 120. Light detection assembly 250 has a light sensor 265 that is configured to detect at least a portion of light 215, from one or more pulses of light or a continuous infrared light beam, that is reflected from an object that extends across light 215, and therefore off weigh platter 105, towards proximal edge 115 and within field-of-view 255. To restrict field-of-view 255, light sensor 265 can be set deep within housing 15 or the path of field-of-view 255 can be folded with reflectors or prisms to locate light sensor 265 wherever needed inside housing 15. The deep inset of light sensor 265 helps light sensor 265 remain immune to other outside light sources. Light sensor 265 can have a second field-of-view 270 that is larger than field-of-view 255 of light detection assembly 250 and light detection assembly 250 can have one or more optical elements that are configured to constrain field-of-view 270 of light sensor 265 to field-of-view 255 of light detection assembly 250. For example, at least one of the optical elements can be an aperture 280, which could be formed in a wall or protrusion of housing 15 or could be formed through another wall or structure that is part of weigh platter assembly 100A, positioned in front of light sensor 265, where a center of aperture 280 is coaxial with a central field-of-view axis 275 of field-of-view 270 of light sensor 265. In addition, a lens 285 can also be positioned in front of aperture 280 and configured to focus the reflected portion of light 215 onto light sensor 265. For example, aperture 280 can be 1 millimeter or smaller and be positioned 3 inches back from lens 285, which will provide a magnification of approximately 400% at distal edge 125 of weigh platter 105.

Light source 210 can be positioned above or beside lens 285 or could also be located on the same printed circuit board as light sensor 265 and a light pipe or guide tube (with a lens or prism at the front to guide the light to overlap with field-of-view 255 of light detection assembly 250) used to guide the light to the front of upper housing 30.

Controller 290 is in communication with light source 210 of light emission assembly 205 and light sensor 265 of light detection assembly 250. If light emission assembly 205 is configured to emit one or more pulses of light from light source 210, controller 290 can be configured to measure a time-of-flight of a pulse of light reflected from an object. The time-of-flight is the time elapsed from when the pulse of light is emitted by light emission assembly 205 to when at least a portion of the pulse of light is reflected back to light detection assembly 250 and detected by light sensor 265. Controller 290 can also be configured to determine if an object extends across lateral edge 120 and off of weigh platter 105 by determining if the time-of-flight of the reflected portion of the pulse of light is equal to or greater than a predetermined time-of-flight, which is the predetermined time elapsed from when a light pulse is emitted by light emission assembly 205 to when at least a portion of the pulse of light is reflected back to light detection assembly 250 from an object that located at distal edge 125 of weigh platter 105 and detected by light sensor 265. If a measured time-of-flight is equal to or greater than the predetermined time-of-flight, or if a pulse of light is not reflected back to light detection assembly 250, this indicates that there is no object extending across lateral edge 120 between proximal edge 115 and distal edge 125 and controller 290 can be configured to allow the measure weight of the object to be recorded by a host system operatively coupled to controller 290. If the measured time-of-flight is less than the predetermined time-of-flight this indicates that there is an object extending across lateral edge 120 between proximal edge 115 and distal edge 125 and controller 290 can be configured to prevent the measured weigh of the object from being recorded by the host system and/or provide some type of visual or audio alert. Controller 290 can also be configured to determine a location of the object along lateral edge 120 based on the time-of-flight. The shorter the time-of-flight, the closer the object is to light sensor 265 and, therefore, to proximal edge 115. The longer the time-of-flight, the further the object is from light sensor 265 and, therefore, from proximal edge.

If light emission assembly 205 is configured to emit a continuous light beam, such as a continuous infrared light beam, from light source 210, controller 290 can be configured to measure a signal strength of the reflected light from an object and detected by lights sensor 265. Controller 290 can also be configured to determine if an object extends across lateral edge 120 and off of weigh platter 105 by determining if signal strength of the reflected light is equal to or greater than a predetermined signal strength value. If a measured signal strength is equal to or less than the predetermined signal strength value, or if the light is not reflected back to light detection assembly 250, this indicates that there is no object extending across lateral edge 120 between proximal edge 115 and distal edge 125 and controller 290 can be configured to allow the measure weight of the object to be recorded by a host system operatively coupled to controller 290. If the measured signal strength is greater than the predetermined signal strength value this indicates that there is an object extending across lateral edge 120 between proximal edge 115 and distal edge 125 and controller 290 can be configured to prevent the measured weigh of the object from being recorded by the host system and/or provide some type of visual or audio alert. Controller 290 can also be configured to determine a location of the object along lateral edge 120 based on the signal strength. The higher the signal strength, the closer the object is to light sensor 265 and, therefore, to proximal edge 115. The lower the signal strength, the further the object is from light sensor 265 and, therefore, from proximal edge.

As shown in FIG. 3, in operation, light emission assembly 205 of off-platter detection assembly 200 emits light 215 from light source 210 along lateral edge 120 of weigh platter 105. Light detection assembly 250 has field-of-view 255 along lateral edge 120. When an object 70 extends across light 215, and therefore off weigh platter 105, a portion of light 215 is reflected from object 70 and towards light sensor 265 (represented by arrow A) and light sensor 265 detects the portion of light 215 reflected from object 70. Controller 290 receives a signal from light sensor 265 indicating that reflected light from object 70 has been detected and either a time the reflected light was detected (if light emission assembly 205 emits pulses of light) or a signal strength of the reflected light (if light emission assembly 205 emits a continuous infrared light beam). Depending on the time-of-flight or signal strength of the reflected light, controller 290 then determines if and where object 70 extends across lateral edge 120 and off weigh platter 105, as discussed above. If controller 290 determines that object 70 does extend across lateral edge 120, the controller can provide an alert that there is a potential off-platter event. For example, as shown in FIG. 3, the alert provided by controller 290 could be a display of a platter representation 240 on a visual display 235 operatively coupled to controller 290, such as the display of a POS, with an indication 245 of the location where the object extends over lateral edge 120 displayed in platter representation 240. Platter representation 240 could be any representation of weigh platter 105, such as a live video feed received from an imaging assembly 295 positioned above weigh platter 105 and operatively coupled to controller 290, a photographic representation of weigh platter 105, or a drawing, illustration, or rendering of weigh platter 105.

Figure 6:
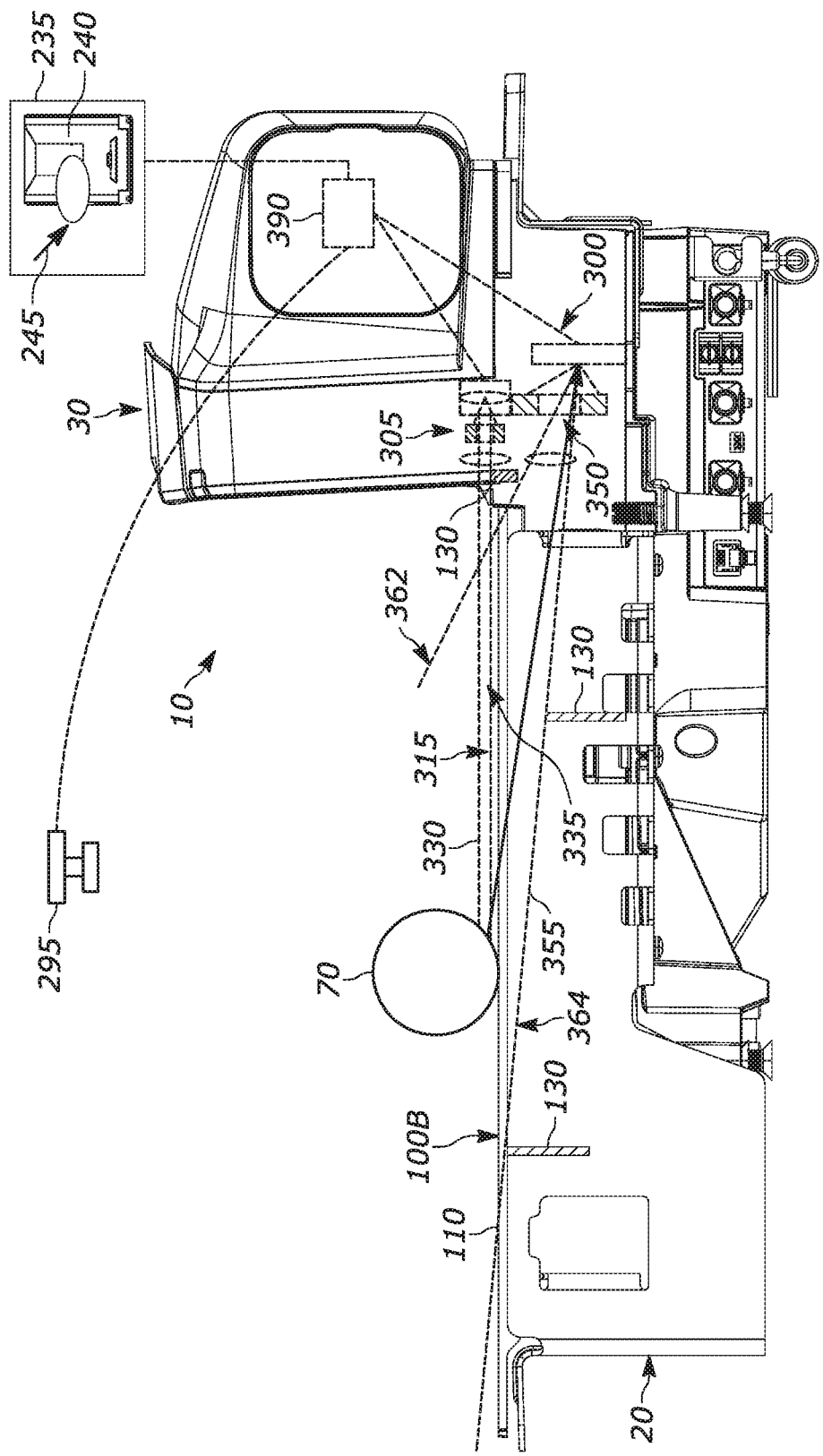
FIG. 6 illustrates the barcode scanner of FIG. 5 with an object extending across a lateral edge of the weigh platter assembly.
Figure 7:
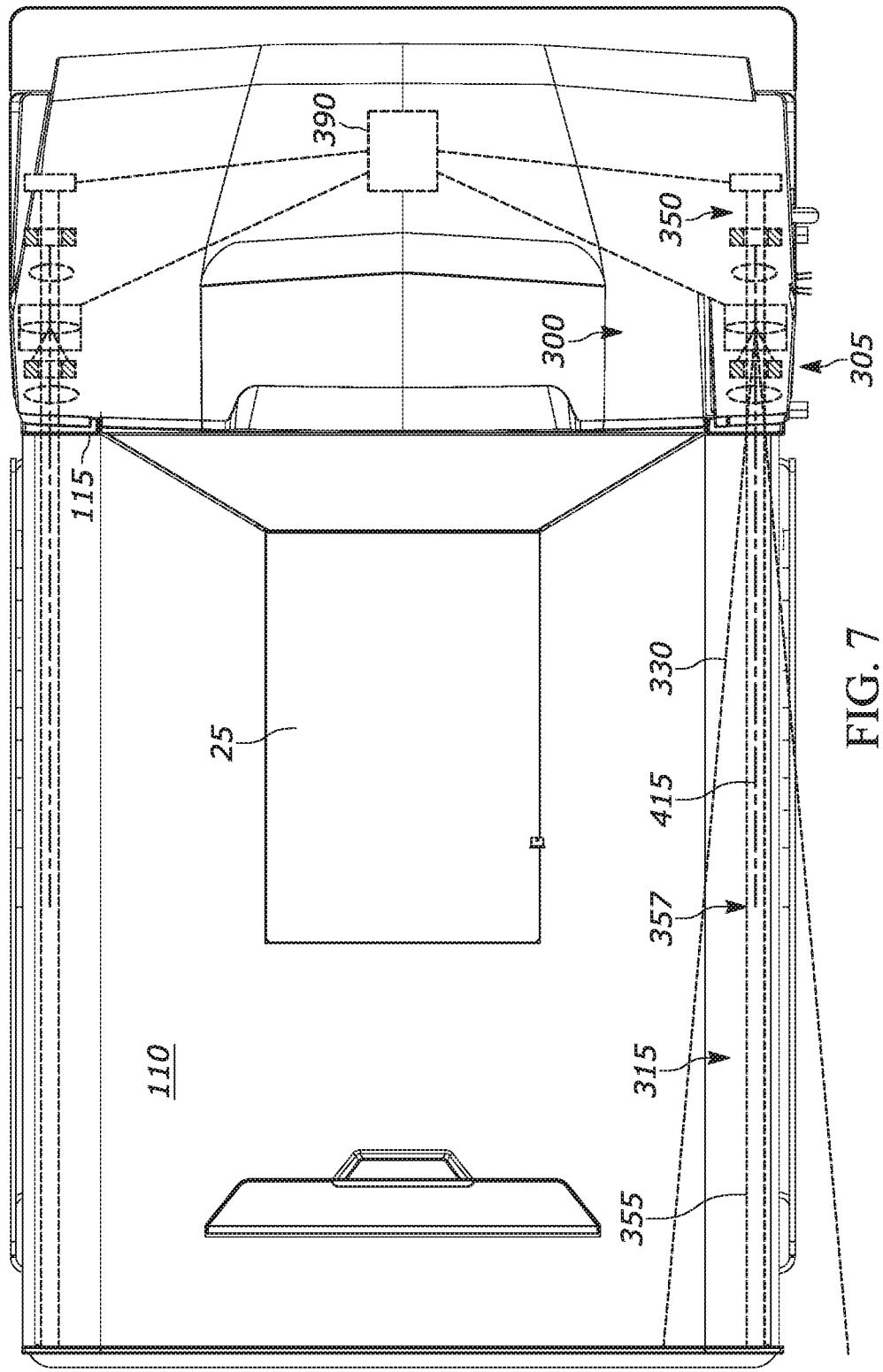
FIG. 7 illustrates a top view of the barcode scanner of FIG. 5.
Figure 8:
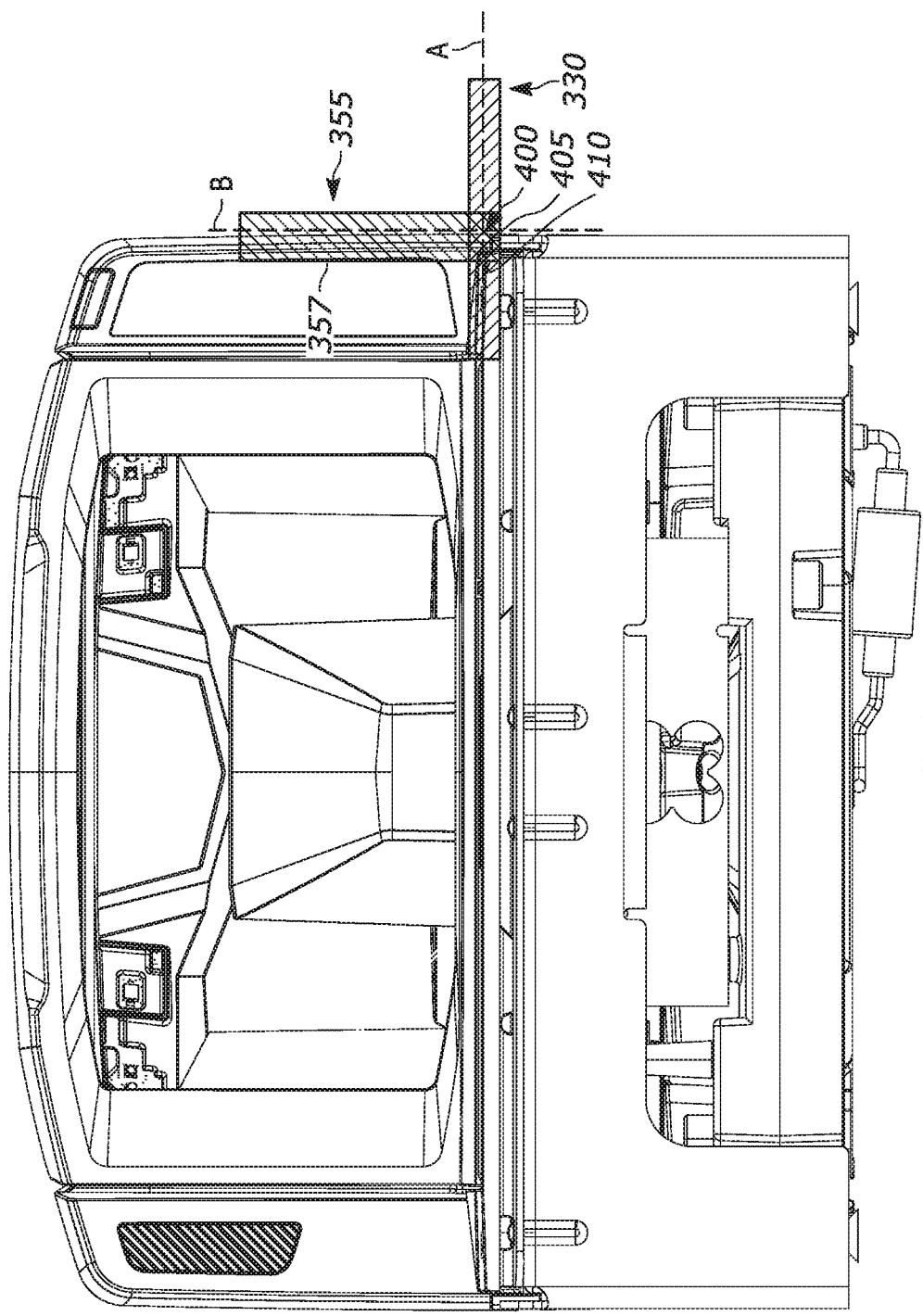
FIG. 8 illustrates a front view of the barcode scanner of FIG. 5.

Referring to FIGS. 5-9, barcode scanner 10 is illustrated with another example weigh platter assembly 100B, which includes weigh platter 105 and a second example off-platter detection assembly 300. The example off-platter detection assembly 300 generally includes a light emission assembly 305, light detection assembly 350, and controller 390 in communication with light emission assembly 305 and light detection assembly 350. For simplicity, only a single light emission assembly 305 and light detection assembly 350 along lateral edge 120 are described herein, however, it will be understood that off-platter detection assembly 300 can also include a second light emission assembly and a second light detection assembly on an opposite side of weigh platter assembly 100B to detect objects that extend over an opposing lateral edge, opposite lateral edge 120, as shown in FIG. 7.

Light emission assembly 305 can be located within upper housing 30 of housing 15 just above surface 110 of weigh platter 105 and in line with lateral edge 120, has a light source 310, and is configured to emit a light 315 away from proximal edge 115, towards distal edge 125, and along surface 110 of weigh platter 105. Light source 310 preferably emits a continuous light beam on the infrared wavelength (e.g., an infrared wavelength of 940 nm) and can have a field-of-view 312 that is wider than the field-of-view 330 of light emission assembly 305. Light emission assembly 305 can also include an aperture 320, which could be formed in a wall or protrusion of housing 15 or could be formed through another wall or structure that is part of weigh platter assembly 100B, positioned in front of light source 310 to constrain field-of-view 312 of light source 310 into field-of-view 330 such that field-of-view 330 is constrained to a horizontal line along surface 110 and extends uncollimated in a generally horizontal first plane A, which is a transverse plane above and substantially adjacent and parallel to the transverse plane of surface 110, and collimated in a generally vertical second plane B, generally perpendicular to first plane A and to the transverse plane of surface 110 and parallel to lateral edge 120. When constrained by aperture 320, field-of-view 330 will have a superior boundary 335 that is substantially adjacent surface 110 of weigh platter 105. A lens 325 can also be positioned in front of aperture 320 and configured to focus light 315. In addition, although off-platter detection assembly 300 does not require any bumps or physical barriers at distal edge 125 of weigh platter 105, if desired, a barrier 60 (see FIG. 9) can be positioned at distal edge 125 of surface 110 of weigh platter 105, opposite light emission assembly 305, and can be made of a material and/or color that is absorptive to the wavelength of light 315 to prevent reflection of light 315 from objects or users that are beyond distal edge 125.

Light detection assembly 350 can also be located within housing 15 and positioned below the transverse plane of surface 110 of weigh platter 105 and has a field-of-view 355, with a central field-of-view axis 360. Light detection assembly 350 has a light sensor 365 that is configured to detect at least a portion of light 315 that is reflected from an object that extends across light 315, and therefore off weigh platter 105, towards proximal edge 115 and within field-of-view 355. Light sensor 365 can have a second field-of-view 370 that is larger than field-of-view 355 of light detection assembly 350 and light detection assembly 350 can have one or more optical elements that are configured to restrict field-of-view 370 of light sensor 365 to field-of-view 355 of light detection assembly 350 such that field-of-view 355 is limited to a vertical line that looks upward towards surface 110 and extends uncollimated in second plane B (sagittal plane) and collimated in first plane A. For example, at least one of the optical elements can be an aperture 380, which could be formed in a wall or protrusion of housing 15 or could be formed through another wall or structure that is part of weigh platter assembly 100B, positioned in front of light sensor 365, where a center of aperture 380 is coaxial with a central field-of-view axis 375 of field-of-view 370 of light sensor 365. When constrained by aperture 380, field-of-view 355 will have a lateral boundary 357 that is substantially parallel relative to lateral edge 120 of weigh platter 105 and substantially adjacent lateral edge 120. In addition, a lens 385 can also be positioned in front of aperture 380 and configured to focus the reflected portion of light 315 onto light sensor 365. Weigh platter assembly 100B can also have one or more baffles 130 that are positioned within housing 15 and can also be configured to reduce field-of-view 370 to field-of-view 355 such that a superior boundary 362 of field-of-view 355 intercepts surface 110 of weigh platter 105 substantially at proximal edge 115 and an inferior boundary 364 of field-of-view 355 intercepts surface 110 substantially at distal edge 125 so that field-of-view 355 extends uncollimated from substantially proximal edge 115 to distal edge 125. This limits field-of-view 355 of light detection assembly 350 to the length of weigh platter 105 and helps to prevent light detection assembly 350 from detecting light that is reflected from objects that are beyond distal edge 125 and proximal edge 115.

Alternatively, rather than field-of-view 330 of light emission assembly 305 extending uncollimated horizontally and field-of-view 355 of light detection assembly 350 extending uncollimated vertically, they could be reversed. In this case, second plane B would be a transverse plane above and substantially adjacent and parallel to the transverse plane of surface 110 and first plane A would be substantially perpendicular to first plane A and to the transverse plane of surface 110 and parallel to lateral edge 120. In this arrangement, the superior boundary of field-of-view 355 would be substantially adjacent surface 110 of weigh platter 105 and field-of-view 330 of light emission assembly 305 would extend in a sagittal plane parallel relative to lateral edge 120 and would have a lateral boundary parallel relative to lateral edge 120 and substantially adjacent lateral edge 120.

With field-of-view 330 of light emission assembly 305 and field-of-view 355 of light detection assembly 350 being restricted as described above, field-of-view 330 overlaps field-of-view 355 to form an overlap region/assembly field-of-view 400 that extends from proximal edge 115 to distal edge 125 and closely follows lateral edge 120 of weigh platter 105. Overlap region/assembly field-of-view 400 has an assembly central field-of-view axis 415 that is substantially parallel relative to lateral edge 120 and overlap region/assembly field-of-view 400 is substantially adjacent and parallel to lateral edge 120. Overlap region/assembly field-of-view 400 has a superior boundary 405 that is parallel relative to surface 110 and substantially adjacent surface 110 and a lateral boundary 410 that is parallel relative to lateral edge 120 and substantially adjacent lateral edge 120. One benefit provided by off-platter detection assembly 300 is that the limited height of overlap region/assembly field-of-view 400 prevents false reads from objects that overhang weigh platter 105 at a greater height (such as the ends of a watermelon), which do not present a problem for accurate weighing.

Controller 390 is in communication with light source 310 of light emission assembly 305 and light sensor 365 of light detection assembly 350 and is configured to determine if an object extends across lateral edge 120 and off of weigh platter 105 by determining if light sensor 365 is detecting any light 315 within overlap region/assembly field-of-view 400 being reflected back towards proximal edge 115. If light sensor 365 does not detect light 315 being reflected back to light detection assembly 350 within overlap region/assembly field-of-view 400 (light detection assembly can send a first value to controller 390), controller 390 can be configured to allow a measured weight of an object on weigh platter 105 to be recorded by a host system that is operatively coupled to controller 390. If light sensor 365 does detect light 315 being reflected back to light detection assembly 350 within overlap region/assembly field-of-view 400 (light detection assembly can send a second value to controller 390), controller 390 can be configured to prevent the measured weight from being recorded by the host system and or provide a visual or audio alert. Controller 390 can also be configured to determine a location of the object along lateral edge 120 based on the signal strength detected by light sensor 365. The higher the signal strength, the closer the object is to light sensor 365 and, therefore, to proximal edge 115. The lower the signal strength, the further the object is from light sensor 365 and, therefore, from proximal edge.

As shown in FIG. 6, in operation, light emission assembly 305 of off-platter detection assembly 300 emits light 315 from light source 310 along surface 110 of weigh platter 105 and across lateral edge 120. Light detection assembly 350 has field-of-view 355 along lateral edge 120. When an object 70 extends across light 315 in overlap region/assembly field-of-view 400, and therefore off weigh platter 105, a portion of light 315 is reflected from object 70 and towards light sensor 365 (represented by arrow A) and light sensor 365 detects the portion of light 315 reflected from object 70. Controller 390 receives a signal from light sensor 365 indicating that reflected light from object 70 has been detected and controller 390 then determines if and where object 70 extends across lateral edge 120 and off weigh platter 105, as discussed above. If controller 390 determines that object 70 does extend across lateral edge 120, controller 390 can provide an alert that there is a potential off-platter event. For example, as shown in FIG. 6, the alert provided by controller 390 could be a display of a platter representation 240 on a visual display 235 operatively coupled to controller 390, such as the display of a POS, with an indication 245 of the location where the object extends over lateral edge 120 displayed in platter representation 240. Platter representation 240 could be any representation of weigh platter 105, such as a live video feed received from an imaging assembly 295 positioned above weigh platter 105 and operatively coupled to controller 390, a photographic representation of weigh platter 105, or a drawing, illustration, or rendering of weigh platter 105.

Off-platter detection assembly 200 and off-platter detection assembly 300 can also be configured to monitor lateral edge 120 of weigh platter 105 only in certain circumstances, such as: a camera recognizing a priority item to be weighed; the scanning of a barcode with barcode scanner 10 that corresponds to a priority item; or and operator entering a code or selecting an item on a point-of-sale or other screen corresponding to a priority item. In these instances, a database of priority items can reside in the barcode scanner, the host, or a cloud server.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations. Moreover, no steps of any method disclosed herein shall be understood to have any specific order unless it is expressly stated that no other order is possible or required by the remaining steps of the respective method. Also, at least some of the figures may or may not be drawn to scale.

The benefits, advantages, solutions to problems, and any element(s) that may cause any benefit, advantage, or solution to occur or become more pronounced are not to be construed as a critical, required, or essential features or elements of any or all the claims. The legal scope of the property right is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The patent claims at the end of this patent application are not intended to be construed under 35 U.S.C. § 112(f) unless traditional means-plus-function language is expressly recited, such as "means for" or "step for" language being explicitly recited in the claim(s).

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A weigh platter assembly for use in a barcode scanner, the weigh platter assembly comprising:
   a weigh platter having a surface extending in a first transverse plane, wherein the weigh platter is configured to measure a weight of an object placed on the surface and the surface has a proximal edge and a lateral edge non-parallel relative to the proximal edge; and
   an off-platter detection assembly comprising:
      an assembly field-of-view extending from the proximal edge, the assembly field-of-view being constrained to have an assembly central field-of-view axis substantially parallel relative to the lateral edge and at least one lateral boundary substantially adjacent to the lateral edge;
      a light emission assembly having a light source, the light emission assembly configured to emit a light away from the proximal edge;
      a light detection assembly having a light sensor, the light detection assembly configured to detect at least a portion of the light reflected towards the proximal edge; and
      a controller in communication with the light detection assembly and configured to allow the measured weight to be recorded by a host system operatively coupled to the controller in response to a first value from the light detection assembly and prevent the measured weight from being recorded by the host system and/or provide an alert in response to a second value from the light detection assembly.

2. The weigh platter assembly of claim 1, wherein the controller is configured to determine a location where the object extends over the lateral edge and the alert is a display of a platter representation with an indication of the location where the object extends over the lateral edge displayed in the platter representation on a visual display operatively coupled to the controller.

3. The weigh platter assembly of claim 2, wherein the platter representation is one of a live video feed received from an imaging assembly positioned above the weigh platter, a photographic representation of the weigh platter, or a rendering of the weigh platter.

4. The weigh platter assembly of claim 1, wherein the light sensor has a transverse field-of-view angle greater than a transverse field-of-view angle of the assembly field-of-view and the weigh platter assembly further comprises one or more optical elements configured to constrain the transverse field-of-view angle of the light sensor to the transverse field-of-view angle of the assembly field-of-view.

5. The weigh platter assembly of claim 4, wherein at least one of the one or more optical elements comprises an aperture positioned in front of the light sensor, a center of the aperture being coaxial with a central field-of-view axis of the light sensor.

6. The weigh platter assembly of claim 5, wherein the weigh platter assembly further comprises a lens positioned in front of the aperture and configured to focus the portion of the light reflected towards the proximal edge onto the light sensor.

7. The weigh platter assembly of claim 1, wherein the light source has a field-of-view greater than the assembly field-of-view and the light emission assembly further comprises one or more optical elements configured to constrain the field-of-view of the light source transversely to the assembly field-of-view.

8. The weigh platter assembly of claim 1, comprising a barrier positioned at a distal edge of the surface of the weigh platter, opposite the light emission assembly and the proximal edge, the barrier being made of a material and/or color that is absorptive to a wavelength of the light emitted from the light emission assembly.

9. A weigh platter assembly for use in a barcode scanner, the weigh platter assembly comprising:
   a weigh platter having a surface extending in a traverse plane, wherein the weigh platter is configured to measure a weight of an object placed on the surface and the surface has a proximal edge, a distal edge opposite the proximal edge, and a lateral edge non-parallel relative to the proximal edge and the distal edge; and
   an off-platter detection assembly comprising:
   a light emission assembly configured to emit one or more pulses of light away from the proximal edge and along the lateral edge;
   a light detection assembly having a field-of-view extending from the proximal edge to at least the distal edge and along the lateral edge and having a light sensor configured to detect at least a portion of the one or more pulses of light reflected towards the proximal edge within the field-of-view, the field-of-view having a central field-of-view axis parallel relative to the lateral edge; and
   a controller configured to measure a time-of-flight (TOF) of reflected light, the TOF of reflected light comprising the time the one or more pulses of light are emitted by the light emission assembly to the time the at least a portion of the one or more pulses of light are reflected back to the light detection assembly and detected by the light sensor;
   wherein the controller is further configured to allow the measured weight to be recorded by a host system operatively coupled to the controller in response to a measured TOF being equal to or greater than a predetermined TOF and prevent the measured weight from being recorded by the host system and/or provide an alert in response to a measured TOF being less than the predetermined TOF.

10. The weigh platter assembly of claim 9, wherein the controller is configured to determine a location where the object extends over the lateral edge based on the measured TOF and the alert is a display of a platter representation with an indication of the location where the object extends over the lateral edge displayed in the platter representation on a visual display operatively coupled to the controller.

11. The weigh platter assembly of claim 10, wherein the platter representation is one of a live video feed received from an imaging assembly positioned above the weigh platter, a photographic representation of the weigh platter, or a rendering of the weigh platter.

12. The weigh platter assembly of claim 9, wherein the predetermined TOF is a time the one or more pulses of light are emitted by the light emission assembly to a time at least a portion of the one or more pulses of light are reflected back to the light detection assembly from an object located at the distal edge and detected by the light sensor.

13. The weigh platter assembly of claim 9, wherein the central field-of-view axis is substantially adjacent the lateral edge.

14. The weigh platter assembly of claim 9, wherein: the field-of-view of the light detection assembly is a first field-of-view; the light sensor has a second field-of-view; and the light detection assembly comprises one or more optical elements configured to constrain the second field-of-view to the first field-of-view, the second field-of-view being larger than the first field-of-view.

15. The weigh platter assembly of claim 14, wherein at least one of the one or more optical elements comprises an aperture positioned in front of the light sensor, wherein the center of the aperture is coaxial with a central field-of-view axis of the light sensor.

16. The weigh platter assembly of claim 15, further comprising a lens positioned in front of the aperture and configured to focus the portion of the reflected pulse of light onto the light sensor.

17. The weigh platter assembly of claim 9, comprising an aperture that constrains a field-of-view of the one or more pulses of light.

18. The weigh platter assembly of claim 17, further comprising a lens positioned in front of the aperture and configured to focus the one or more pulses of light.

19. A weigh platter assembly for use in a barcode scanner, the weigh platter assembly comprising:
   a weigh platter having a surface extending in a transverse plane, wherein the weigh platter is configured to measure a weight of an object placed on the surface and the surface has a proximal edge, a distal edge opposite the proximal edge, and a lateral edge non-parallel relative to the proximal edge and the distal edge; and
   an off-platter detection assembly comprising:
   a light emission assembly configured to emit light away from the proximal edge and along the lateral edge;
   a light detection assembly having a field-of-view along the lateral edge and a light sensor configured to detect at least a portion of light reflected towards the proximal edge within the field-of-view; and
   a controller configured to measure a signal strength of the reflected light detected by the light sensor, allow the measured weight to be recorded by a host system operatively coupled to the controller in response to the strength of the reflected light detected by the light sensor being equal to or less than a predetermined strength value, and prevent the measured weight from being recorded by the host system and/or provide an alert in response to the strength of the reflected light detected by the light sensor being greater than the predetermined strength value.

20. The weigh platter assembly of claim 19, wherein the controller is configured to determine a location where the object extends over the lateral edge and the alert is a display of a platter representation with an indication of the location where the object extends over the lateral edge displayed in the platter representation on a visual display operatively coupled to the controller.

21. The weigh platter assembly of claim 20, wherein the platter representation is one of a live video feed received from an imaging assembly positioned above the weigh platter, a photographic representation of the weigh platter, or a rendering of the weigh platter.

22. The weigh platter assembly of claim 19, wherein: the field-of-view of the light detection assembly is a first field-of-view; the light sensor has a second field-of-view; and the light detection assembly comprises one or more optical elements configured to restrict the second field-of-view to the first field-of-view, the second field-of-view being larger than the first field-of-view.

23. The weigh platter assembly of claim 22, wherein at least one of the one or more optical elements comprises an aperture positioned in front of the light sensor, wherein the center of the aperture is coaxial with a central field-of-view axis of the light sensor.

24. The weigh platter assembly of claim 23, further comprising a lens positioned in front of the aperture and configured to focus the portion of the reflected light onto the light sensor.

25. The weigh platter assembly of claim 19, comprising an aperture that constrains a field-of-view of the emitted light.

26. The weigh platter assembly of claim 25, further comprising a lens positioned in front of the aperture and configured to focus the emitted light.

27. The weigh platter assembly of claim 19, comprising a barrier positioned at the distal edge of the surface of the weigh platter, opposite the light emission assembly, the barrier being made of a material and/or color that is absorptive to a wavelength of the light emitted from the light emission assembly.

28. A weigh platter assembly for use in a barcode scanner, the weigh platter assembly comprising:
   a weigh platter having a surface extending in a transverse plane, wherein the weigh platter is configured to measure a weight of an object placed on the surface, wherein the surface has a proximal edge, a distal edge opposite the proximal edge, and a lateral edge non-parallel relative to the proximal edge and the distal edge; and
   an off-platter detection assembly comprising:
   a light emission assembly configured to emit light away from the proximal edge and having a field-of-view extending uncollimated in a first plane and collimated in a second plane perpendicular to the first plane;
   a light detection assembly having a field-of-view and a light sensor configured to detect at least a portion of light reflected towards the proximal edge within the light detection assembly field-of-view; wherein
   the light detection assembly field-of-view extends uncollimated in the second plane and collimated in the first plane;
   the light detection assembly field-of-view having a lateral boundary parallel relative to the lateral edge and substantially adjacent the lateral edge; and
   the light emission assembly field-of-view overlaps the light detection assembly field-of-view to form an overlap region substantially adjacent and parallel to the lateral edge, the overlap region having a superior boundary parallel relative to the surface of the weigh platter substantially adjacent the surface of the weigh platter and a lateral boundary parallel relative to the lateral edge and substantially adjacent the lateral edge; and
   a controller configured to allow the measured weight to be recorded by a host system operatively coupled to the controller when the light sensor does not detect light reflected back to the light detection assembly within the overlap region and to prevent the measured weight from being recorded by the host system and/or provide an alert when the light sensor detects light reflected back to the light detection assembly within the overlap region.

29. The weigh platter assembly of claim 28, wherein the controller is configured to determine a location where the object extends over the lateral edge based on a signal strength of the light reflected back to the light detection assembly and the alert is a display of a platter representation with an indication of the location where the object extends over the lateral edge displayed in the platter representation on a visual display operatively coupled to the controller.

30. The weigh platter assembly of claim 29, wherein the platter representation is one of a live video feed received from an imaging assembly positioned above the weigh platter, a photographic representation of the weigh platter, or a rendering of the weigh platter.

31. The weigh platter assembly of claim 28, wherein:
   the first plane comprises a transverse plane substantially adjacent the transverse plane of the surface, the light emission assembly field-of-view having a superior boundary substantially adjacent the surface of the weigh platter;
   the light detection assembly field-of-view extends in a sagittal plane parallel relative to the lateral edge; and
   the light detection assembly field-of-view has a lateral boundary parallel relative to the lateral edge and substantially adjacent the lateral edge.

32. The weigh platter assembly of claim 31, wherein the light sensor is positioned below the transverse plane of the surface of the weigh platter.

33. The weigh platter assembly of claim 31, wherein a superior boundary of the field-of-view of the light detection assembly intercepts the surface of the weigh platter at substantially the proximal edge of the surface and an inferior boundary of the field-of-view of the light detection assembly intercepts the surface of the weigh platter at substantially the distal edge of the surface, such that the field-of-view of the light detection assembly extends uncollimated from substantially the proximal edge of the surface to substantially the distal edge of the surface.

34. The weigh platter assembly of claim 33, wherein the light sensor comprises a field-of-view larger than the field-of-view of the light detection assembly, the weigh platter assembly further comprising one or more baffles configured to reduce the field-of-view of the light sensor to the field-of-view of the light detection assembly.

35. The weigh platter assembly of claim 28, wherein: the field-of-view of the light detection assembly is a first field-of-view; the light sensor has a second field-of-view; and the light detection assembly comprises one or more optical elements configured to restrict the second field-of-view to the first field-of-view, the second field-of-view being larger than the first field-of-view.

36. The weigh platter assembly of claim 35, wherein at least one of the one or more optical elements comprises an aperture positioned in front of the light sensor, wherein the center of the aperture is coaxial with a central field-of-view axis of the light sensor.

37. The weigh platter assembly of claim 36, further comprising a lens positioned in front of the aperture and configured to focus the portion of the reflected light onto the light sensor.

38. The weigh platter assembly of claim 28, wherein:
   the first plane comprises a transverse plane substantially perpendicular to the transverse plane of the surface, the light detection assembly field-of-view having a superior boundary substantially adjacent the surface of the weigh platter;
   the light emission assembly field-of-view extends in a sagittal plane parallel relative to the lateral edge; and
   the light emission assembly field-of-view has a lateral boundary parallel relative to the lateral edge and substantially adjacent the lateral edge.

39. The weigh platter assembly of claim 28, comprising a barrier positioned at the distal edge of the surface of the weigh platter, opposite the light emission assembly, the barrier being made of a material and/or color that is absorptive to a wavelength of the light emitted from the light emission assembly.

* * * * *